United States Patent
Durante et al.

(10) Patent No.: US 7,437,933 B2
(45) Date of Patent: Oct. 21, 2008

(54) MICRO-ELECTRO-MECHANICAL STRUCTURE HAVING ELECTRICALLY INSULATED REGIONS AND MANUFACTURING PROCESS THEREOF

(75) Inventors: Guido Spinola Durante, Gavirate (IT); Simone Sassolini, Vidigulfo (IT); Marco Ferrera, Abbiategrasso (IT); Mauro Marchi, Magenta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 201 days.

(21) Appl. No.: 11/177,474

(22) Filed: Jul. 7, 2005

(65) Prior Publication Data

US 2006/0070441 A1    Apr. 6, 2006

(30) Foreign Application Priority Data

Jul. 12, 2004    (EP) .................................. 04425514

(51) Int. Cl.
*H01L 21/306*    (2006.01)
*H01L 23/24*    (2006.01)
*G01P 9/04*    (2006.01)

(52) U.S. Cl. .................... 73/504.15; 73/504.12; 216/13; 257/618; 438/50

(58) Field of Classification Search .............. 73/504.12, 73/504.15; 257/618; 216/13; 438/50
See application file for complete search history.

(56) References Cited

U.S. PATENT DOCUMENTS

| | | | | |
|---|---|---|---|---|
| 5,233,213 A | * | 8/1993 | Marek | .......................... 257/415 |
| 5,581,035 A | * | 12/1996 | Greiff | ...................... 73/514.32 |
| 5,747,961 A | | 5/1998 | Ward et al. | .................. 318/646 |
| 5,948,981 A | * | 9/1999 | Woodruff | ................. 73/514.29 |
| 6,197,655 B1 | | 3/2001 | Montanini et al. | .......... 438/411 |
| 6,198,145 B1 | * | 3/2001 | Ferrari et al. | ................ 257/415 |
| 6,214,243 B1 | * | 4/2001 | Muenzel et al. | ................. 216/2 |
| 6,257,059 B1 | | 7/2001 | Weinberg et al. | ........ 73/504.16 |
| 6,311,556 B1 | * | 11/2001 | Lefort et al. | ............. 73/514.29 |
| 6,376,291 B1 | * | 4/2002 | Barlocchi et al. | ........... 438/175 |
| 6,391,741 B1 | * | 5/2002 | Mastromatteo et al. | ..... 438/455 |

(Continued)

FOREIGN PATENT DOCUMENTS

EP    1 253 399 A1    10/2002

(Continued)

OTHER PUBLICATIONS

Yan, G., et al., "Integrated Bulk-Micromachined Gyroscope Using Deep Trench Isolation Technology,"*IEEE*, pp. 605-608, 2004.

*Primary Examiner*—Thomas P Noland
(74) *Attorney, Agent, or Firm*—Lisa K. Jorgenson; Harold H. Bennett, II; Seed IP Law Group PLLC

(57) ABSTRACT

Micro-electro-mechanical structure formed by a substrate of semiconductor material and a suspended mass extending above the substrate and separated therefrom by an air gap. An insulating region of a first electrically insulating material extends through the suspended mass and divides it into at least one first electrically insulated suspended region and one second electrically insulated suspended region. A plug element of a second electrically insulating material different from the first electrically insulating material is formed underneath the insulating region and constitutes a barrier between the insulating region and the air gap for preventing removal of the insulating region during fabrication, when an etching agent is used for removing a sacrificial layer and forming the air gap.

35 Claims, 5 Drawing Sheets

U.S. PATENT DOCUMENTS

| | | | |
|---|---|---|---|
| 6,395,618 B2 | 5/2002 | Vergani et al. | 438/411 |
| 6,433,401 B1 | 8/2002 | Clark et al. | 257/524 |
| 6,469,330 B1 * | 10/2002 | Vigna et al. | 438/50 X |
| 6,766,689 B2 | 7/2004 | Durante et al. | 73/504.04 |
| 7,043,985 B2 * | 5/2006 | Ayazi et al. | 73/504.12 X |
| 7,258,008 B2 * | 8/2007 | Durante et al. | 73/504.12 X |
| 2001/0032508 A1 | 10/2001 | Lemkin et al. | 73/514.32 |
| 2004/0055382 A1 * | 3/2004 | Samuels et al. | 438/50 X |
| 2004/0089069 A1 * | 5/2004 | Weber et al. | 73/514.18 |
| 2004/0227725 A1 | 11/2004 | Calarco et al. | 345/156 |

FOREIGN PATENT DOCUMENTS

| | | |
|---|---|---|
| WO | WO 98/57529 | 12/1998 |
| WO | WO 01/20259 | 3/2001 |

* cited by examiner

MICRO-ELECTRO-MECHANICAL STRUCTURE HAVING ELECTRICALLY INSULATED REGIONS AND MANUFACTURING PROCESS THEREOF

BACKGROUND OF THE INVENTION

1. Field of the Invention

The present invention refers to a micro-electro-mechanical structure having electrically insulated regions and the manufacturing process thereof. In particular, the present description makes reference to of micro-integrated gyroscopes, without, however, being limited to these.

2. Description of the Related Art

As is known, integrated gyroscopes of semiconductor material, manufactured using micro-electro-mechanical-systems (MEMS) technology, operate on the basis of the theorem of relative accelerations, exploiting the acceleration of Coriolis. In particular, when a linear velocity is applied to a mobile mass rotating with angular velocity, the mobile mass "senses" an apparent force, called Coriolis force, which determines a displacement thereof in a direction perpendicular to the linear velocity and to the axis of rotation. The apparent force can thus be detected by supporting the mobile mass on springs, which enable a displacement thereof in the direction of the apparent force. On the basis of Hooke's law, the displacement is proportional to the apparent force, and thus detection of the displacement of the mobile mass enables detection of the Coriolis force and consequently of the angular velocity.

In gyroscopes of the type considered, the displacement of the mobile mass is detected capacitively by measuring at resonance the variations in capacitance caused by the movement of mobile sensing electrodes fixed to the mobile mass and interfaced with or comb-fingered to fixed sensing electrodes.

An embodiment of an integrated gyroscope manufactured using planar MEMS technology is, for example, described in U.S. Pat. No. 6,766,689, issued in the name of the present applicant. This integrated gyroscope is formed by an actuation assembly; a sensitive mass, which is actuated in a first direction lying in the plane of the sensitive mass and is moreover mobile in a second direction, which also lies in the plane of the sensitive mass; and a capacitive sensing system facing the sensitive mass and capable of detecting the movements thereof in the second direction. The gyroscope has an axis of rotation perpendicular to the plane of the sensitive mass so that, in presence of an external angular velocity, the sensitive mass moves in the second direction.

Another patent application in the name of the present applicant (U.S. patent application Ser. No. 10/685,292) describes a gyroscope capable of detecting the Coriolis force even when this acts in a direction perpendicular to the plane of the sensitive mass.

To obtain high performance and prevent cross-talk between actuation and reading of the signal, it is desirable to bias at different voltages the actuation assembly and the sensitive mass, at least in the part facing the capacitive sensing system.

Since in current gyroscopes made as MEMS, the two mechanical blocks are formed in a same structural layer (polysilicon layer), it is necessary to uncouple them electrically by insulating regions.

The same problem is present, on the other hand, in other MEMS, for example in accelerometers, where it may be necessary or at least preferable to electrically separate two suspended adjacent parts.

BRIEF SUMMARY OF THE INVENTION

Embodiments of the invention provide a MEMS structure having electrical insulation of two parts, without any risk of removal of the insulating region during freeing of the suspended regions.

According to an embodiment of the present invention, there is provided a micro-electro-mechanical structure having electrically insulated suspended regions. The structure includes a substrate of semiconductor material and a suspended mass extending above the substrate, the suspended mass being separated from the substrate by an air gap and being supported by anchoring regions. An insulating region of a first electrically insulating material extends through the suspended mass and divides the suspended mass into a first electrically insulated suspended region and a second electrically insulated suspended region. A plug element of a second electrically insulating material different from the first electrically insulating material, extends underneath the insulating region and forms a barrier between the insulating region and the air gap.

According to other embodiments, manufacturing processes are provided for forming the micro-electro-mechanical structure outlined above, as well as for forming structures in accordance with additional embodiments of the invention.

BRIEF DESCRIPTION OF THE SEVERAL VIEWS OF THE DRAWING(S)

For an understanding of the present invention, some preferred embodiments thereof are now described only by way of non-limiting examples, with reference to the attached drawings, wherein.

DETAILED DESCRIPTION OF THE INVENTION

Electrical insulation of different parts of an integrated device including a gyroscope and a circuit has been proposed (see, for example, "Integrated Bulk-Micromachined Gyroscope Using Deep Trench Isolation Technology" by Guizhen Yan et al., 2004, 0-7803-8265-X/04, 2004, IEEE and WO 01/20259). However, the method of fabrication described in this document envisages the removal of a part of the structural layer from the back to free the suspended structures and hence does not teach a fabrication process with removal of a buried sacrificial layer capable of preventing simultaneous removal of the insulating regions. In fact, in the latter case, there exists the risk that the agents used for removing the buried sacrificial layer will also remove the insulating regions, thus impairing the integrity and functionality of the gyroscope.

According to one aspect of the invention, the insulation of the suspended parts to be separated electrically is obtained by forming trenches filled with insulating material (typically oxide or oxide and polysilicon). The bottom ends of the insulating regions are protected by bottom plugs of material resistant to the etching for freeing the mobile structures, whilst the top ends are protected by top plugs.

The following description regards an embodiment of a gyroscope, having suspended regions formed by at least two parts to be electrically insulated, as well as the manufacturing process thereof.

Figure 1:
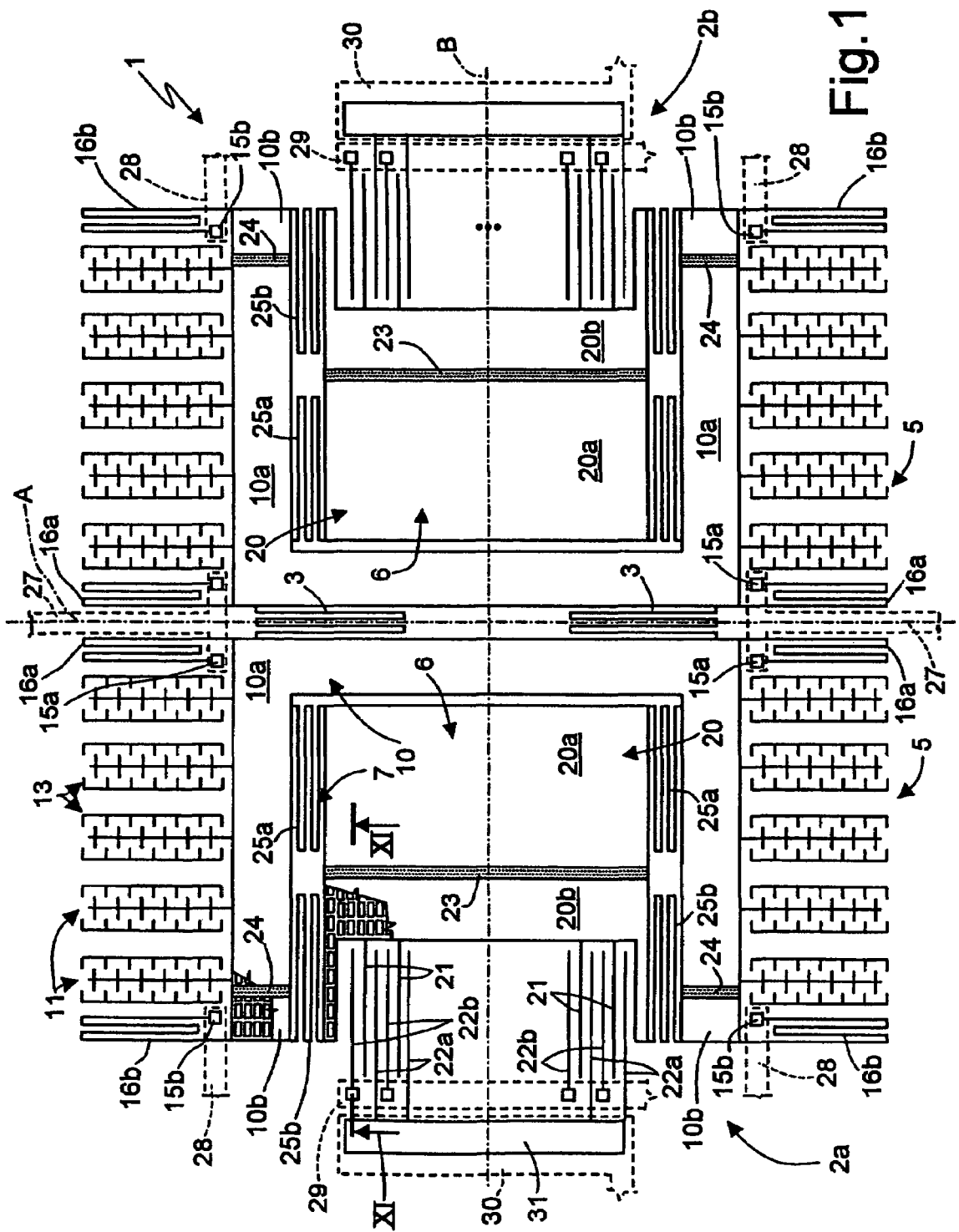
FIG. 1 shows a top view of a layout of an integrated gyroscope having mutually insulated regions.
Figure 2:
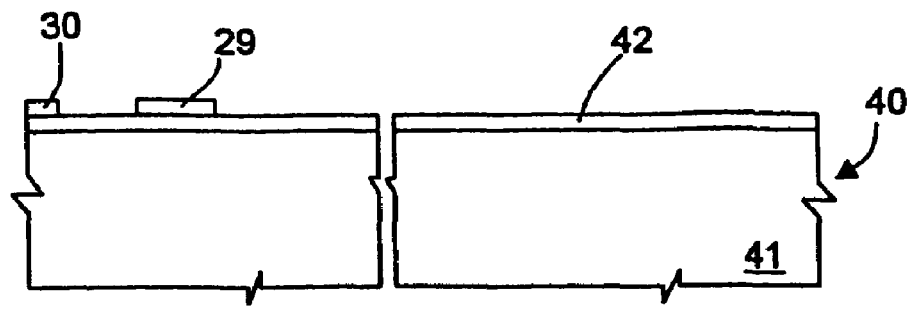
FIGS. 2-11 are cross-sectional views through a wafer of semiconductor material, in successive manufacturing steps of the gyroscope of FIG. 1.

FIG. 1 shows the layout of a gyroscope 1 of the general type described in the aforementioned U.S. patent application Ser. No. 10/128,133. The gyroscope 1 is formed by two parts 2a, 2b, which are symmetrical with respect to a central symmetry axis designated by A and are connected together via two central springs 3, arranged symmetrically with respect to a horizontal centroidal axis, designated by B.

Each part 2a, 2b comprises an actuation system 5, an accelerometer 6, and a mechanical connection 7, which connects the actuation system 5 to the accelerometer 6. In the following description, reference will be made to the left-hand part 2a, but the description is perfectly applicable also to the right-hand part 2b.

In detail, the actuation system 5 comprises an actuation mass 10 having an open concave shape (C shape); mobile actuation electrodes 11, connected to the actuation mass 10; and fixed actuation electrodes 13, comb-fingered to the mobile actuation electrodes 12. The actuation mass 10 is supported by first and second anchorages 15a, 15b via two first and two second anchoring springs 16a, 16b, connected to the actuation mass 10 next to the four outer corners of the actuation mass 10.

The accelerometer 6 comprises a sensing mass 20 and mobile sensing electrodes 21, comb-fingered to first and second fixed sensing electrodes 22a, 22b. The sensing mass 20 is surrounded on three sides by the actuation mass 10 and is supported thereby through two first coupling springs 25a and two second coupling springs 25b. The coupling springs 25a, 25b form the mechanical connection 7 and are connected to the sensing mass 20 next to the corners. The mobile sensing electrodes 21 extend from the sensing mass 20 from the side of this not facing the actuation mass 10.

The sensing mass 20 is divided into a first part 20a and a second part 20b by a first insulating region 23; likewise, the actuation mass 10 is divided into a main portion 10a and two end portions 10b by two second insulating regions 24.

In detail, the first insulating region 23 extends approximately parallel to the central symmetry axis A so that the first part 20a of the sensing mass 20 is supported and connected to the actuation mass 10 only via the first coupling springs 25a, while the second part 20b of the sensing mass 20 is supported and connected to the actuation mass 10 only via the second coupling springs 25b.

Furthermore, the second insulating regions 24 extend transversely to the respective C-shaped arms so that the main portion 10a of the actuation mass 10 is connected only to the first coupling springs 25a and to the first anchoring springs 16a, while the end parts 10b of the actuation mass 10 is connected only to the second coupling springs 25b and to the second anchoring springs 16b. The position of the second insulating regions 24 is moreover such that the mobile actuation electrodes 11 extend starting from the main portion 10a of the actuation mass 10 and are electrically connected thereto.

Actuation biasing regions 27, of buried type, are connected to the first anchoring regions 15a; first sensing biasing regions 28, which are also of buried type, are connected to the second anchoring regions 15b; second sensing biasing regions 29 are connected to the first fixed sensing electrodes 22a; and third sensing biasing regions 30 are connected to the second fixed sensing electrodes 22b through a supporting region 31.

In this way, the first part 20a of the sensing mass 20, the first coupling springs 25a, the main portion 10a of the actuation mass 10, the mobile actuation electrodes 11, the first anchoring springs 16a, and the first anchoring regions 15a are all set at a same potential, applied via the actuation biasing regions 27, and are electrically insulated, via the insulating regions 23, 24, from the rest of the suspended structures, which include the second part 20b of the sensing mass 20, the second coupling springs 25b, the end portions 10b of the actuation mass 10, the second anchoring springs 16b, and the second anchoring regions 15b, biased via the first sensing biasing regions 28.

Hereinafter, with reference to FIGS. 2-11, a first embodiment of a process for manufacturing the gyroscope 1 of FIG. 1 is described, in particular as regards the insulating regions 23, 24. FIGS. 2-11 hence represent sections taken along line XI-XI of FIG. 1, in successive manufacturing steps.

Initially (FIG. 2), a wafer 40 formed by a substrate 41 of monocrystalline semiconductor material (for example, silicon) is coated by an insulating layer 42. For example, the insulating layer 42 can be formed by a multilayer, comprising a bottom oxide layer grown thermally and a top layer of deposited silicon nitride. Then a polycrystalline semiconductor material layer, typically silicon, is deposited, and this is removed selectively so as to form buried connection regions (in the example, the second and third sensing biasing regions 29, 30).

Figure 3:
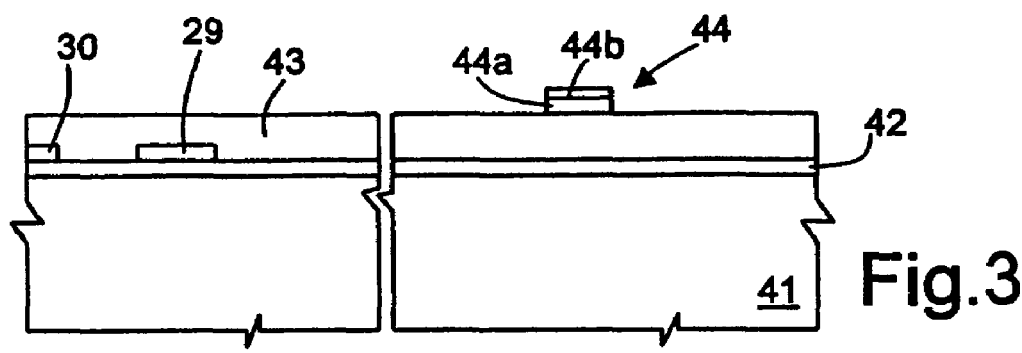

Next, FIG. 3, a sacrificial oxide layer 43, for example TEOS, is deposited, and a bottom protective region 44 is formed. To this aim, a polysilicon layer (for example with a thickness of 300 nm) is deposited. This is oxidized superficially and, via an appropriate mask, is removed selectively, so that the bottom protective region 44 comprises a polysilicon region 44a and an oxide region 44b.

Figure 4:
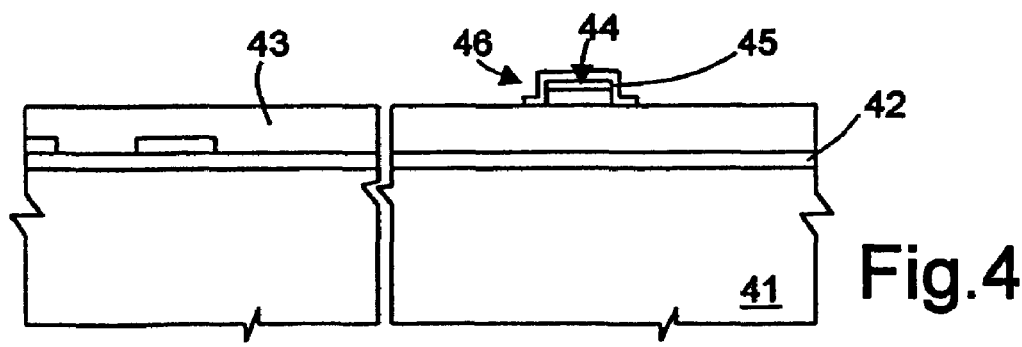

Then, FIG. 4, a silicon carbide layer (for example with a thickness of 200 nm) is deposited, and is removed selectively so as to cover, at the top and laterally, the bottom protective region 44, forming a top protective region 45. The bottom protective region 44/top protective region 45 ensemble forms a bottom plug element 46, as explained in greater detail hereinafter. For the gyroscope of FIG. 1, a bottom plug element 46 is formed for each insulating region 23, 24 and follows its conformation in top view. In particular, each bottom plug element 46 has a width greater than the respective insulating region 23, 24, so as to close it underneath also in case of slight misalignment in the corresponding masks, as will be obvious to the person skilled in the art.

Figure 5:
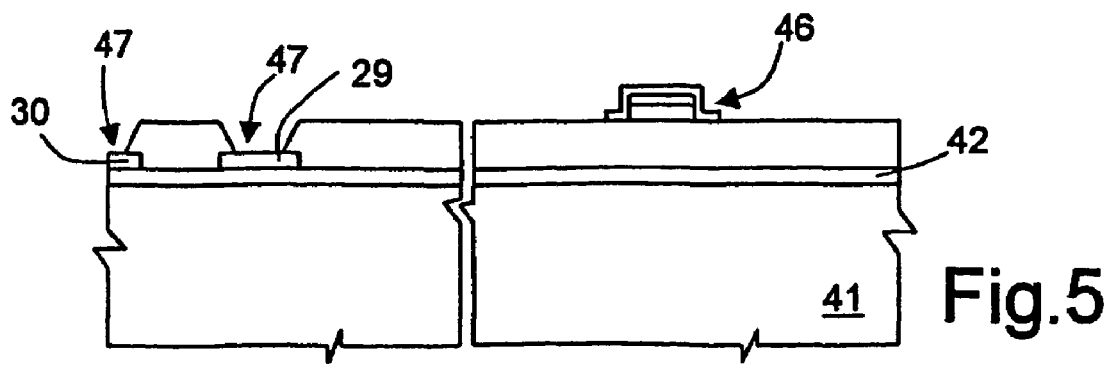
Figure 6:
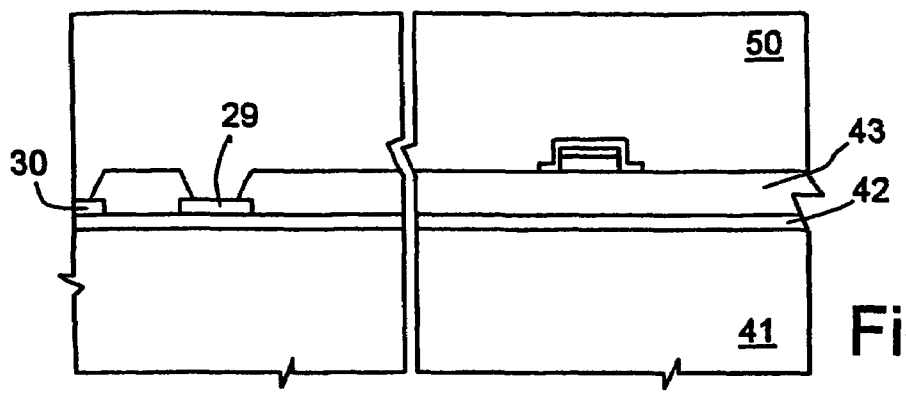
Figure 7:
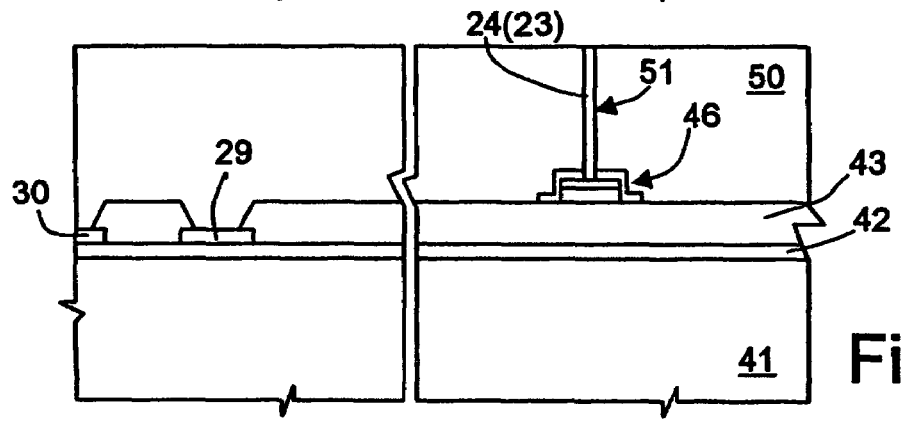

The wafer 40 is then masked, and the sacrificial oxide layer 43 is selectively removed so as to form openings 47 at the biasing regions (in FIG. 5, the biasing regions 29, 30).

Subsequently (FIG. 6), a polysilicon layer 50 is grown, typically after depositing a polysilicon germ layer. For example, the polysilicon layer 50 can have a thickness of 15-20 μm.

After planarization of the wafer 40 and doping of the polysilicon layer 50, the polysilicon layer 50 is etched so as to form trenches 51 (FIG. 7) where it is desired to form the first and second insulating regions 23, 24 (FIG. 1). The trenches 51 extend downwards as far as the bottom plug element 46, since etching of the silicon terminates automatically when the oxide region 44b is reached. Then, the trenches 51 are filled with dielectric material, typically oxide, or oxide and polysilicon, to form the insulating regions 23, 24 (whereof, in the cross-sectional view of FIG. 7, only the insulating region 24 is visible).

Figure 8:
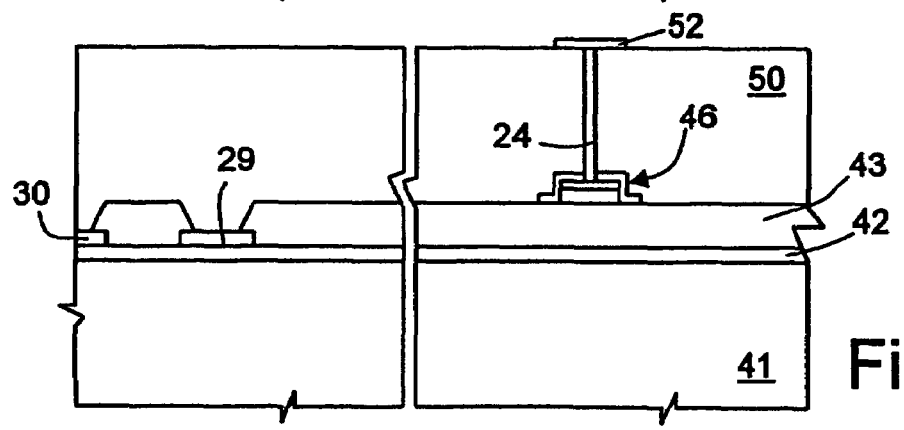
Figure 9:
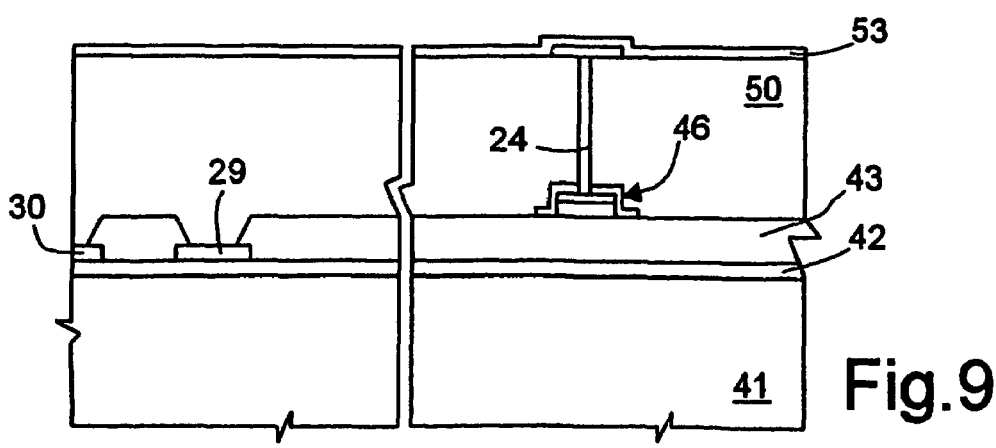

Next, FIG. 8, an insulating material layer (for example TEOS) is deposited and is shaped so as to form top plugs 52. Also the top plugs 52 follow the layout of the insulating regions 23, 24, and also these are of greater width, so as to guarantee the top protection of the insulating regions 23, 24.

Next, in a way not shown, metal regions are formed where necessary, and (FIG. 9) a hard-mask layer 53 is deposited, for example of silicon carbide. Then, using an appropriate resist mask (not illustrated), the hard-mask layer 53 is etched, and (see FIG. 10) using the remaining portions of the hard-mask layer 53, the polysilicon layer 50 is trench etched, to form trenches 54, which define the MEMS structure, separating, among others, the fixed regions from the mobile ones, as well as, where envisaged, the fixed regions that are to be biased at different voltages.

Figure 11:
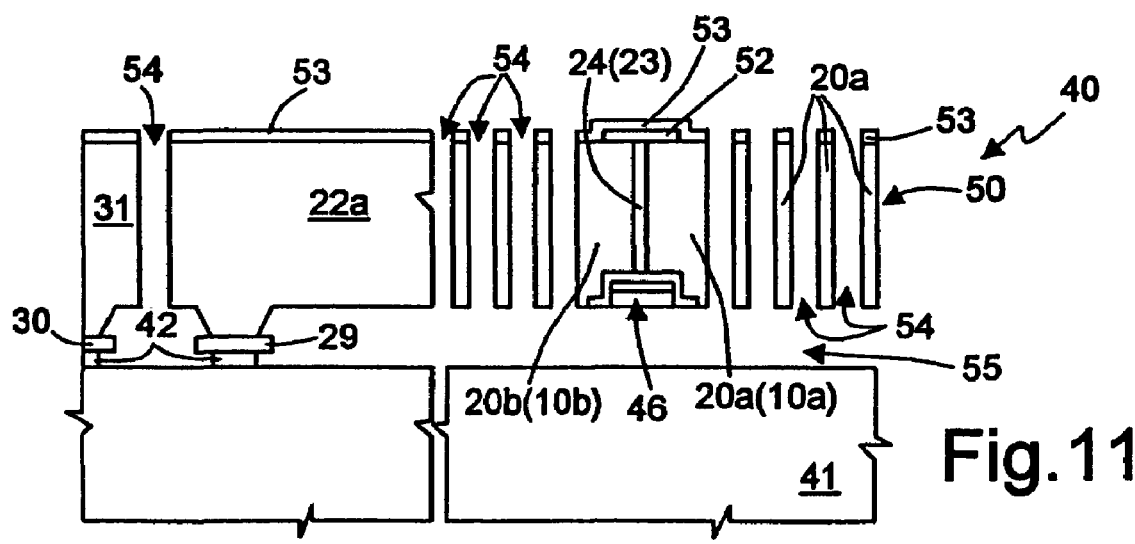

Finally, FIG. 11, the mobile structures are freed. To this end, and in a per se known manner, the sacrificial layer 43 is removed through the trenches 54 underneath the trenches 54 and underneath the thin structures (to this end, as illustrated in FIG. 1 for a small portion of the actuation mass 10 and of the sensing mass 20, all the mobile structures are perforated, in a per se known manner). An air gap 55 is then formed where the sacrificial layer 43 has been removed.

The structure of FIG. 11 shows, starting from the left, the supporting region 31 and the corresponding third sensing biasing regions 30, a part of the second fixed sensing electrodes 22b, and the corresponding second sensing biasing regions 29, as well as the second part 20b and the first part 20a of the sensing mass 20, separated by the insulating region 23. It should moreover be noted that the insulating region 23 is closed underneath by the bottom plug element 46 and at the top by the top plug element 52.

In practice, in the bottom plug element 46, the top protective region 45 of silicon carbide guarantees electrical insulation of the bottom protective region 44 (and in particular of the polysilicon region 44a) with respect to the parts 20a and 20b of the sensing mass 20 and thus of the two parts 20a, 20b with respect to each other. The top protective region 45 moreover forms a first barrier to etching. The oxide region 44b guarantees, in addition to the top protective region 45, that the etching stops on the bottom plug element 46 while defining the mobile structures and moreover improves electrical insulation. The polysilicon region 44a guarantees protection from beneath of the other portions of the bottom plug element 46 and thus of the insulating region 23, 24 during removal of the sacrificial layer 43.

It should be noted that the insulating regions 23, 24 are not protected on the side facing the trenches 54 during etching of the polysilicon layer 50; however, in this direction, the removal of a small portion of the insulating regions 23, 24 is not problematical, given the thickness, in the direction considered of the insulating regions 23, 24.

Alternatively, the top protective region 45 can be formed by a single layer of silicon nitride, instead of silicon carbide.

Figure 12:
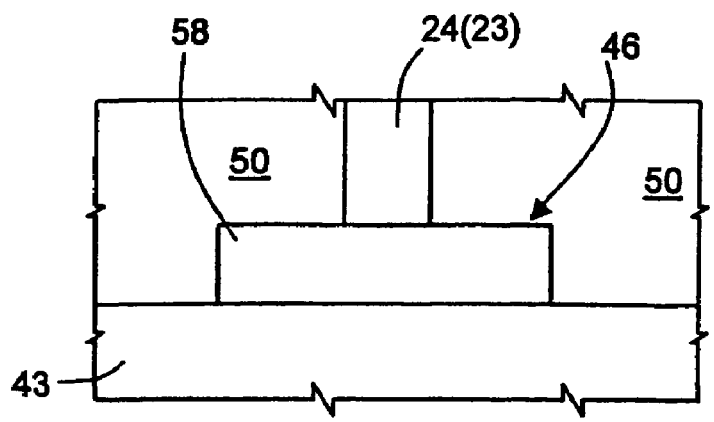
FIGS. 12-15 are cross-sectional views of a detail of the gyroscope of FIG. 1, according to different embodiments.

FIG. 12 shows a variant of the bottom plug element 46. In this figure, which illustrates the structure in an intermediate manufacturing step before removal of the sacrificial layer 43, the bottom plug element 46 is formed by a single region of silicon carbide 58.

In this case, the region of silicon carbide 58 has the function both of electrical insulation and of stop etch and of protection during the removal of the sacrificial layer.

The manufacturing process is similar to the above, except for the fact that it requires a single step for depositing the silicon carbide and its definition, instead of the steps described with reference to FIGS. 3 and 4.

Figure 13:
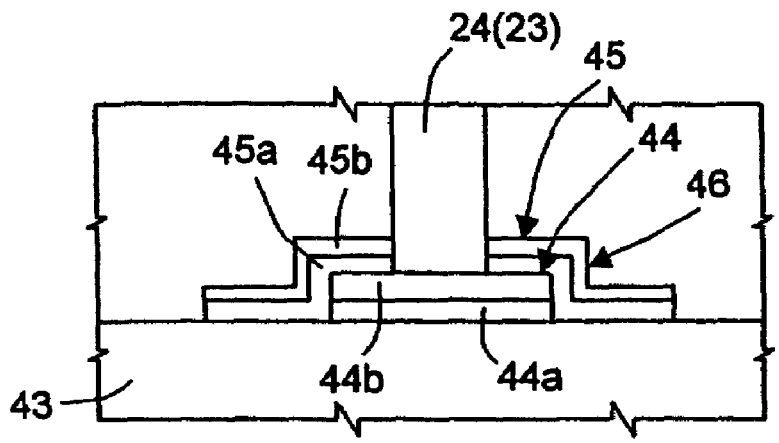

FIG. 13 shows another embodiment of the bottom plug element 46. In this figure, the bottom plug element 46 is formed again by a bottom protective region 44 and by a top protective region 45, as described with reference to FIG. 4, but the top protective region 45 is formed by two portions: a bottom portion 45a of silicon carbide and a top portion 45b of silicon nitride. The bottom protective region 44 is formed also here by a polysilicon region 44a and an oxide region 44b.

In this case, the top portion 45b of the top protective region 45 forms a barrier to the doping agents present in the polysilicon layer 50 and thus improves electrical insulation between the polysilicon layer 50 and the bottom protective region 44.

The plug element of FIG. 13 is obtained by forming the bottom protective region 44, as described with reference to FIG. 3, and then a silicon carbide layer, followed by a silicon nitride layer, are deposited and shaped with a same mask, so as to be self-aligned.

Figure 10:
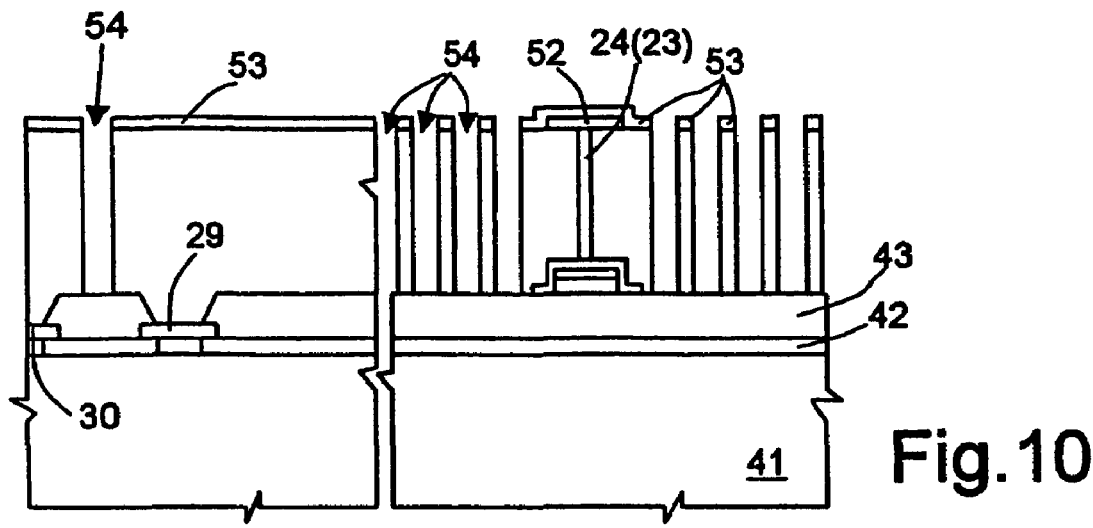
Figure 14:
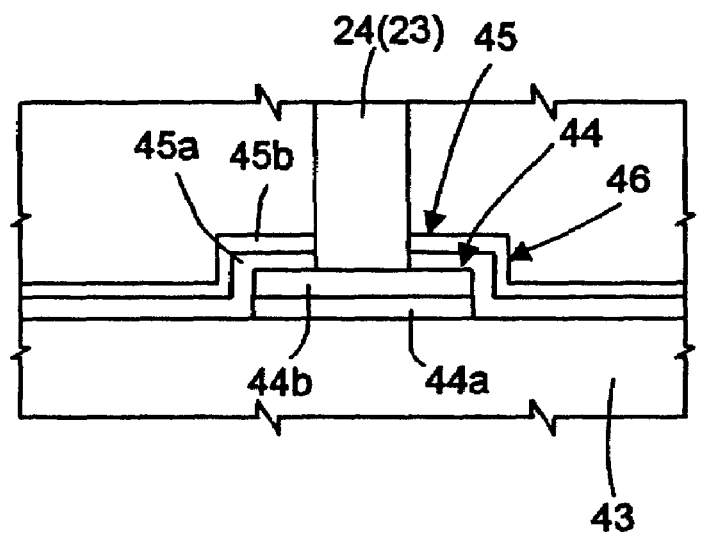

FIG. 14 shows another embodiment of the bottom plug element 26, similar to that of FIG. 13, in which, however, the silicon carbide layer 45a and the silicon nitride layer 45b are not defined before the growth of the polysilicon layer 50, but extend underneath the entire polysilicon layer. They are then removed partially only at the trenches 54 during definition of the suspended structures (FIG. 10).

According to yet another embodiment (not illustrated), only the silicon carbide layer 45a is provided and extends underneath the entire polysilicon layer 50 in a way similar to what is illustrated in FIG. 14.

Figure 15:
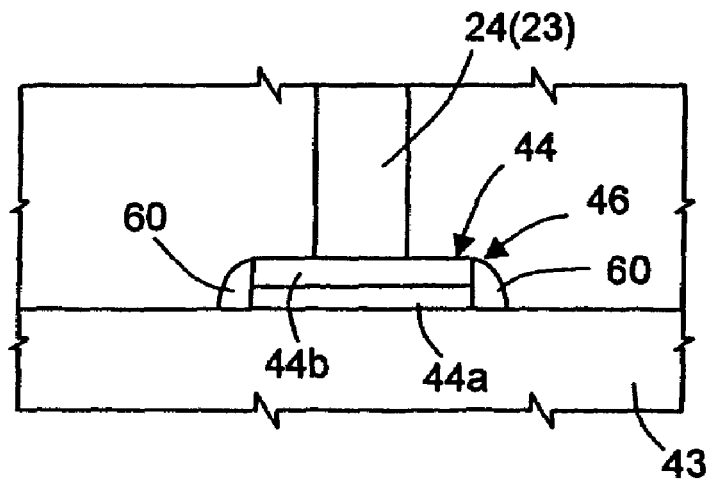

Finally, FIG. 15 shows an embodiment, wherein the bottom protective region 44 has spacers 60 of silicon nitride. To this end, after defining the bottom protective region 44, as described with reference to FIG. 3, a silicon nitride layer is deposited and then etched in an anisotropic way so as to be removed completely above the bottom protective region 44 and to remain only at the sides thereof. This solution is advantageous in that it saves a mask.

Finally, it is clear that numerous modifications and variations can be made to the process and to the insulating structures described and illustrated herein, all falling within the scope of the invention, as defined in the annexed claims.

In particular, it is emphasized that the insulating structure comprising the insulating regions 23, 24 and the corresponding plug elements 46 can be used also for MEMS of different types.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A micro-electro-mechanical structure comprising:
a substrate of semiconductor material;
a suspended mass extending above said substrate, said suspended mass being separated from said substrate by an air gap and being supported by anchoring regions;
at least one insulating region of a first electrically insulating material, extending through said suspended mass and dividing said suspended mass into at least one first electrically insulated suspended region and one second electrically insulated suspended region; and
at least one plug element of a second electrically insulating material different from said first electrically insulating material, said plug element extending underneath said insulating region and forming a barrier between said insulating region and said air gap.

2. The structure according to claim 1 wherein said insulating region has a preset width and layout, and said plug element has said layout and a width greater than said insulating region.

3. The structure according to claim 1 wherein said plug element comprises a bottom protective region and an auxiliary protective region surrounding at least laterally said bottom protective region.

4. The structure according to claim 3 wherein said bottom protective region comprises a polycrystalline silicon portion facing said air gap.

5. The structure according to claim 4 wherein said bottom protective region further comprises a silicon oxide portion overlying said polycrystalline silicon portion.

6. The structure according to claim 3 wherein said auxiliary protective region further extends on top of said bottom protective region and comprises a silicon carbide layer.

7. The structure according to claim 6 wherein said auxiliary protective region further comprises an auxiliary layer overlying said silicon carbide layer, said auxiliary layer being chosen between silicon nitride and silicon carbide.

8. The structure according to claim 6 wherein said auxiliary protective region extends underneath said suspended mass throughout its extension.

9. The structure according to claim 3 wherein said auxiliary protective region comprises silicon nitride spacers.

10. The structure according to claim 1 wherein said plug element comprises a silicon carbide region.

11. The structure according to claim 1 comprising a gyroscope, said suspended mass forming an accelerometer of said gyroscope, including a first part electrically connected to an actuation assembly and a second part electrically connected to sensing electrodes.

12. A micro-electro-mechanical structure, comprising:
a substrate of semiconductor material; and
a first suspended mass movably suspended from the substrate, the first suspended mass including a first insulating region extending through the first suspended mass, separating the first suspended mass into first and second regions electrically isolated from each other.

13. The micro-electro-mechanical device of claim 12 wherein the first insulating region comprises first and second insulating portions, the first insulating portion lying between the second insulating portion and a first surface of the first suspended mass.

14. The micro-electro-mechanical device of claim 13 wherein first insulating portion includes a plurality of insulating layers.

15. The micro-electro-mechanical device of claim 13 wherein the first insulating region comprises a third insulating portion lying between the second insulating portion and a second surface of the first suspended mass.

16. The micro-electro-mechanical device of claim 12 further comprising a second suspended mass movably suspended from the first suspended mass, the second suspended mass including a second insulating region extending through the second suspended mass and separating the second suspended mass into third and fourth regions electrically isolated from each other.

17. The micro-electro-mechanical device of claim 16 wherein the second insulating region comprises first and second insulating portions, the first insulating portion lying between the second insulating portion and a surface of the second suspended mass.

18. The micro-electro-mechanical device of claim 12 wherein:

the substrate of semiconductor material has a first surface defining a first plane;
the first suspended mass includes second and third surfaces defining second and third planes lying substantially parallel to a plane defined by a surface of the substrate of semiconductor material; and
the first insulating region extends along a fourth plane substantially perpendicular to the second and third planes.

19. The micro-electro-mechanical device of claim 12, further comprising:
a first anchoring spring extending from the substrate to the first suspended mass and electrically coupling the first region of the first suspended mass to a first biasing region of the substrate; and
a second anchoring spring extending from the substrate to the first suspended mass and electrically coupling the second region of the first suspended mass to a second biasing region of the substrate.

20. The micro-electro-mechanical device of claim 12, further comprising:
a first and a second plurality of fixed electrodes coupled to the substrate; and
a first plurality of mobile electrodes coupled to the first suspended mass and comb-fingered to the first plurality of fixed electrodes, each of the first plurality of mobile electrodes being electrically coupled to the first region of the first suspended mass and electrically isolated from the second region of the first suspended mass.

21. The micro-electro-mechanical device of claim 20, further comprising:
a second plurality of mobile electrodes supported by the first suspended mass and comb-fingered to the second plurality of fixed electrodes, each of the second plurality of mobile electrodes being electrically coupled to the second region of the first suspended mass and electrically isolated from the first region of the first suspended mass.

22. The micro-electro-mechanical device of claim 21, further comprising:
a second suspended mass supported by the first suspended mass and movable with respect thereto, the second plurality of mobile electrodes being coupled to the second suspended mass and movable therewith, with respect to the first suspended mass.

23. The micro-electro-mechanical device of claim 22, further comprising:
a plurality of coupling springs extending between the first suspended mass and the second suspended mass, the first suspended mass having a C shape, and the second suspended mass being movably supported between arms of the first suspended mass by the plurality of coupling springs, the second plurality of mobile electrodes being electrically coupled to the second region of the first suspended mass by at least one of the plurality of coupling springs.

24. A micro-electro-mechanical device, comprising:
a substrate of semiconductor material having a first surface defining a first plane;
a suspended mass movably suspended from the substrate and having second and third surfaces defining second and third planes substantially parallel to the first plane, the suspended mass including an insulating region extending through the suspended mass along a fourth plane substantially perpendicular to the second and third planes, and separating the suspended mass into first and second regions electrically isolated from each other; and protecting means for protecting the insulating region from manufacturing processes carried out after formation of the insulating region.

25. A micro-electro-mechanical device of claim 24 wherein the protecting means includes a plug region formed along a length of the insulating region and between the insulating region and the second surface of the suspended mass.

26. The micro-electro-mechanical device of claim 24, further comprising:
a first anchoring spring extending from the substrate to the suspended mass and electrically coupling the first region of the suspended mass to a first biasing region of the substrate; and
a second anchoring spring extending from the substrate to the suspended mass and electrically coupling the second region of the suspended mass to a second biasing region of the substrate.

27. A process for manufacturing a micro-electro-mechanical structure, comprising:
forming a suspended mass extending above a substrate of semiconductor material and separated therefrom by an air gap;
forming anchoring regions supporting said suspended mass;
forming at least one insulating region of a first electrically insulating material, extending through said suspended mass and dividing said suspended mass into at least one first electrically insulated suspended region and one second electrically insulated suspended region; and
forming at least one plug element of a second electrically insulating material different from said first electrically insulating material, extending underneath said insulating region so as to act as a barrier between said insulating region and said air gap.

28. The process of claim 27 wherein:
the step of forming a suspended mass comprises:
forming a sacrificial layer above a substrate,
forming a structural layer above said sacrificial layer,
removing selectively portions of said structural layer according to a predetermined layout, and
partially removing said sacrificial layer using etching agents for forming suspended regions;
the step of forming at least one plug element comprises, prior to forming said structural layer:
forming the at least one plug element of material resistant to said etching agents; and
the step of forming at least one insulating region comprises, prior to partially removing said sacrificial layer:
forming at least one insulating trench in said structural layer, in a position overlying and aligned to said plug element; and
filling said insulating trench with insulating material.

29. The process according to claim 28 wherein said step of forming at least one plug element comprises the steps of:
forming a bottom protective region; and
forming an auxiliary protective region surrounding at least laterally said bottom protective region.

30. The process according to claim 29 wherein said step of forming a bottom protective region comprises depositing a polycrystalline silicon layer, forming an oxide layer overlying said polycrystalline silicon layer, and removing selectively said oxide and polycrystalline silicon layers.

31. The process according to claim 29 wherein said step of forming an auxiliary protective region comprises depositing a silicon carbide layer above said bottom protective region and said sacrificial layer.

32. The process according to claim 31, wherein said step of forming an auxiliary protective region further comprises the step of depositing a silicon nitride layer on top of said silicon carbide layer.

33. The process according to claim 31, further comprising removing in a self-aligned way said silicon nitride and silicon carbide layers except above and alongside said bottom protective region.

34. The process according to claim 29 wherein said step of forming an auxiliary protective region comprises depositing a silicon nitride layer above said bottom protective region and said sacrificial layer, and removing said silicon nitride layer except alongside said bottom protective region for forming spacers.

35. The process according to claim 28 wherein said step of forming at least one plug element comprises the step of forming a silicon-carbide protective region.

* * * * *